US005671364A

United States Patent [19]

Turk

[11] Patent Number: 5,671,364
[45] Date of Patent: Sep. 23, 1997

[54] METHOD AND SYSTEM FOR COMMODITY-BASED CURRENCY FOR PAYMENT OF ACCOUNTS AND ELIMINATION OF PAYMENT RISK

[76] Inventor: James J. Turk, P.O. Box 4682, Greenwich, Conn. 06830

[21] Appl. No.: 465,430

[22] Filed: Jun. 5, 1995

Related U.S. Application Data

[63] Continuation-in-part of Ser. No. 15,588, Feb. 10, 1993, abandoned.

[51] Int. Cl.⁶ .............................. G06F 15/30; G06F 15/00
[52] U.S. Cl. ...................... 395/239; 395/201; 395/235; 340/825.35
[58] Field of Search .................... 395/149, 600, 395/239, 201, 235; 364/408, 403, 401 R, 464.01; 340/825.35

[56] References Cited

U.S. PATENT DOCUMENTS

| | | | |
|---|---|---|---|
| 4,023,013 | 5/1977 | Kinker | 235/61.7 |
| 4,312,510 | 1/1982 | Bodner | 273/256 |
| 4,314,352 | 2/1982 | Fought | 235/37.9 |
| 4,891,503 | 1/1990 | Jewell | 235/380 |
| 4,903,201 | 2/1990 | Wagner | 395/237 |
| 4,931,932 | 6/1990 | Dalnekoff et al. | 395/205 |
| 4,933,842 | 6/1990 | Durbin et al. | 395/230 |
| 4,960,981 | 10/1990 | Benton et al. | 235/379 |
| 4,985,833 | 1/1991 | Oncken | 395/242 |
| 4,994,964 | 2/1991 | Wolfberg et al. | 395/236 |
| 5,063,507 | 11/1991 | Lindsey et al. | 395/226 |
| 5,101,353 | 3/1992 | Lupien et al. | 395/237 |
| 5,179,698 | 1/1993 | Bachman et al. | 395/604 |
| 5,220,501 | 6/1993 | Lawlor et al. | 380/24 |
| 5,438,509 | 8/1995 | Heffron | 395/670 |

OTHER PUBLICATIONS

Lee, P. and Ghosh, S.; "NOVAHID: A Novel Architecture for Asynchronous, Hierarchical, International, Distributed, Real–Time Payments Processing,"IEEE Journal on Selected Areas in Communications, v12, n6, pp. 1072–1087. Aug. 1994.

*Primary Examiner*—Willington Chin
*Assistant Examiner*—Melissa Kay Carman
*Attorney, Agent, or Firm*—St. Onge Steward Johnston & Reens

[57] ABSTRACT

A system and method for permitting gold or other commodities to circulate as currency requires a network of system users that participate in financial transactions where payment is made in units of gold. The gold is kept in secure storage at a deposit site for the benefit of the users. The payments in gold are effected through a computer system having data storage and transaction processing programs that credit or debit the units of account of gold held for the account of each system user.

16 Claims, 1 Drawing Sheet

METHOD AND SYSTEM FOR COMMODITY-BASED CURRENCY FOR PAYMENT OF ACCOUNTS AND ELIMINATION OF PAYMENT RISK

This is a Continuation-In-Part of application Ser. No. 08/015,588, filed Feb. 10, 1993; abandoned Jun. 6, 1995.

FIELD OF THE INVENTION

The present invention relates to the field of computerized systems for settlement of financial transactions.

BACKGROUND OF THE INVENTION

In the historic past, precious metals circulated as currency. The metals circulated mainly in the form of coins, and over time improvements were made to coins to improve their reliability. These improvements included, for example, detailed engraving on the face and obverse of the coin, and milling of edges. These improvements were intended to prevent the clipping of coins, which was a process that lightened the weight of the coin. When this practice occurred, the coin was debased, i.e., it lost purchasing power because the coin no longer constituted the weight of gold it was purported to constitute. Each debasement interfered with normal trade and commerce, and these interferences impeded economic activity in general. Subsequently, debasement of coin became subtler, and frequently included substitution of a base metal for the gold.

The circulation of precious metals coins was in time supplanted by certificates during the period from 1680–1840. By this method of currency, the coins of precious metal remained in safe and secure storage, typically a vault facility maintained by a bank or warehouse company. A certificate of deposit, a paper document, was issued by the bank or warehouse company and evidenced the deposit of coin that had been made into the facility, and the certificate of deposit began circulating as a substitute for the coin. Circulation of the certificate, in lieu of the coins, offered numerous advantages. Paper was easier to transport, and a relatively small amount of certificates could be used to complete transactions of high value. There was less risk of debasement of the coin that was stored. However, while these advantages significantly improved the circulating medium, there were also disadvantages. These included forgery of paper certificates, fraud and bankruptcy of the bank or warehouse company.

As a result, another improvement to currency soon emerged. This improvement in the nature of currency was the creation of deposit currency. Deposit currency is a process that enables paper money and/or coin to circulate as currency. By this method of currency, the coins of precious metal and/or the paper currency that represented a claim to those coins, remained in safe and secure storage, typically a vault facility maintained by a bank. Circa 1840 to the present, the circulation of coin and paper money for commercial transaction was supplanted by deposit currency, i.e., money is now moved around mainly by checks and wire transfers.

The creation of deposit currency significantly improved the circulating medium. It was no longer necessary to extensively rely on coins, which could be clipped, debased, etc., nor on paper money, which could be counterfeited. By moving monetary units of account on deposit in one bank to another bank, the process of payments was significantly enhanced.

However, in time unforeseen problems have appeared which detract from the use of deposit currency as a medium of exchange. The institutions in which clients lodge their money and deposit currency sometimes are unable to meet their commitment to their clients to return the clients' coin or paper money. The institutions, typically banks, which accept the deposits of coin and paper money from their client, loan the coin and paper money to other clients. Occasionally these borrowers failed to repay their loans, causing the bank to take a loss. Cumulatively these losses can be large enough to cause the bank to fail. A bank in that case no longer has sufficient coin or paper money to repay its liabilities to its clients.

Because bank failures have caused great harm, much effort has been expended to prevent bank failures where possible and to limit the adverse impact on economic activity should a bank fail. For example, government programs have been implemented to insure depositors that their money will be returned, or that they will otherwise still be able to have access to the value of their deposit currency. The deposit insurance programs are limited to some maximum amount, presently $100,000, so bank clients with deposits greater than the insured amount are at risk for the amount of their deposit currency above the insured limit.

SUMMARY OF THE INVENTION

It is an object of the invention to provide a method and system for a commodity-based currency for payment of accounts that avoids the problems of prior art and deposit currency account systems. It is an object of the invention to provide such a system and method which is independent of external events that cause fluctuations in value of national currencies. It is an object of the invention to provide such a system and method that permits gold and other commodities to circulate as deposit currency.

In accordance with one embodiment of the invention, a commodity based currency system for paying accounts comprises: at least one deposit site having secure facilities for storage of a valuable commodity; an amount of a commodity stored at the deposit site; and a computer system for implementing and recording transactions defined in units of the commodity. The accounting of the transactions is denominated in units of the commodity. The computer system includes: an account data storage device, a transaction data storage means, and a transaction posting means. The account data storage device is capable of recording data identifying persons and a number of units of the commodity credited to each of the persons and held in the deposit site for the account of the persons. The transaction data storage device receives records of transactions denominated in units of the commodity. These records of transactions include an identification of a person who will receive a debit, a person who will receive a credit, the amount of such debit, the amount of such credit, and the identity of the deposit site. The transaction posting means extracts data from the records of transactions and posts debits and credits to the account data storage device to update the data identifying the number of units of the commodity held for the account of each person involved in the transaction.

The system preferably permits remote access to submit transaction records, and provides verification means for verifying the bona fides of the person seeking to submit transaction records. A remote terminal is provided at the deposit site to enter information regarding the commodity held at the deposit site for the account of a person.

In a preferred embodiment, the commodity comprises a precious metal, such as silver, or most preferably, gold of a specified purity.

Other objects, aspects and features of the present invention in addition to those mentioned above will be pointed out in or will be understood from the following detailed description provided in conjunction with the accompanying drawings.

DESCRIPTION OF THE PREFERRED EMBODIMENT

Figure 1:
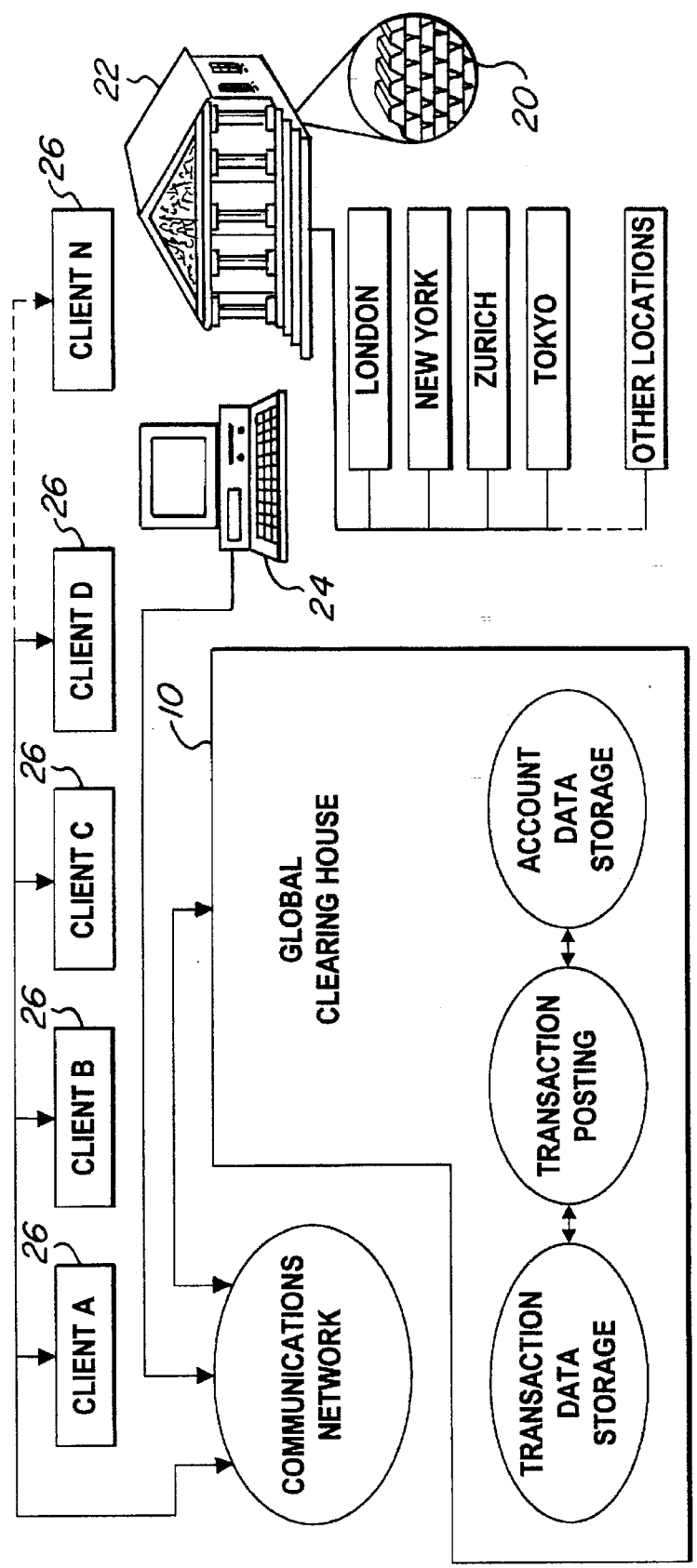
FIG. 1 is a schematic illustration of the operation of the invention.

A glossary of the terms used in the present application is provided hereafter.

As used herein, a "computer system" comprises at least the following components: a central processing unit (CPU), a display device, a data storage device, and a printing capability.

As used herein, "money" is a tool that enables the participants in an exchange of goods and services to define value of the exchange.

As used herein, "currency" means the physical representation of money. Currency is the medium of exchange enabling producers and consumers to exchange goods and services indirectly for other goods and services. Currency is denominated into units of account, which permits economic calculation by the participants in the exchange. Currency also is a means of payment which enables the participants in an exchange to settle their respective obligation.

As used herein, "cash currency" is the paper notes issued by a country's central bank. Each note is denominated in terms of a fixed number of units of account.

As used herein, "deposit currency" is the liability of the banks that accept deposits of a country's national currency.

As used herein, a "clearing house" is a center for processing transactions to credit and debit accounts held by parties to the transaction.

This invention relates to a system and method for payment and receipt of monetary units of account. More specifically, it relates to a clearing house 10 that is the center of an interactive communications network that will enable gold and/or other commodities to be used and freely exchanged as a means of payment, i.e., to be used as currency.

The clearing house is intended to develop an extensive user base located within the United States and globally that will use gold and/or other commodities as a currency for effecting payments in cross-border as well as intra-country commercial transactions. Since this currency is preferably a defined weight of gold or other commodity, the currency of the clearing house will be non-national.

Each system user individually establishes a depository account with the clearing house either by storing gold or other commodity at an affiliated deposit site 22 or by purchasing gold or other commodity already stored at such a deposit site. The deposit site will confirm the deposit of the commodity to the clearing house and transmit the information via remote terminal 24 to the computer system 26 described hereafter. Each account will be denominated in the currency of the clearing house, which is a defined quantity of gold or other commodity (for example, ounces, or kilograms of gold, barrels of oil, etc.). Every system user that establishes an account relationship with the clearing house will become a participant in the network of system users using the payment processing capability provided by the clearing house.

The network of individuals, corporations and other entities that are clients of the clearing house will use communications and information processing technology made available to them by the clearing house to effect transactions in the commodity denominated currency of the clearing house. They will (1) make payments to other members of the network, generally their suppliers, and (2) collect payments from other members of the network, generally their customers.

Though it is envisioned that the clearing house will initially establish working relationships with corporations involved in international trade and commerce, the economies of scale that will be generated by an increasing number of transactions completed through the clearing house means that in time the scope of the clearing house activities can be broadened to include transactions by individuals. The high volumes of payments and receipts now undertaken daily in the course of normal economic activity indicate that the potential opportunities for the application of this invention are very significant.

This invention therefore provides a system and method of settling of payments for transactions through a clearing house with a global scope of operation (hereafter referred to as "Global Clearing House" or "GCH").

The advantages that GCH will offer system users, which differentiates its services from other payments mechanisms now available, include (1) the ability to complete a payment without incurring the risk now inherent in existing mechanisms used to complete payment transactions, (i.e., possible loss of funds deposited in a bank which is seized or which is insolvent), (2) the ability for a client to receive immediate credit and to be immediately informed that monetary units of account have been added to the account kept by the client at GCH, (3) the ability for a client to make immediate payment and to be immediately informed that monetary units of account have been deducted from the account kept by the client at GCH, (4) the ability of a client to maintain monetary units of account on deposit without being exposed to the practice of fractional reserve banking (wherein banks do not keep as a reserve assets equal to the amount and identity of their liabilities) and thereby avoid the risks of partial or total loss of the deposit as a result of the overissue of the currency (where banks create liabilities for currency based on assets which they do not have on hand), (5) the ability of a client to maintain monetary units of account on deposit without being exposed to the risk that those monetary units of account will be loaned by the institution, and (6) the ability to use gold and/or other commodities as currency.

Gold is the preferred commodity as it is a low-risk medium of payment and it has a known value. Gold extinguishes the obligation arising from a transaction in trade and commerce. When the seller receives gold, there is no further obligation because the product sold has been exchanged for a tangible asset. However, a national currency does not necessarily extinguish the obligation incurred when the buyer acquires a product. The seller does not receive a tangible asset. When the seller instead receives a national currency, the seller receives a promise to pay, which is principally dependent upon the central bank which issues the national currency. The obligation can be further at risk if the payment clearing bank is unable to meet its obligations to deliver the currency specified in a transaction.

Using gold as currency also permits the creation of financial instruments and futures contracts denominated in terms of a stated weight of gold. For example, a futures contract for delivery of soybeans could be designated payable in gold units of account instead of in U.S. Dollars. Other commonly traded commodities, i.e., crude oil, agricultural products, etc., could be similarly designated in gold units of account. The transactions would then be processed and cleared through GCH.

The above advantages differentiate the commodity currency processed by GCH from any deposit currency now in use.

Referring now to FIG. 1, a commodity based currency system for paying accounts in accordance with the invention comprises: at least one deposit site; an amount of a commodity stored at the deposit site; and a computer system for implementing and recording transactions defined in units of the commodity.

The Deposit Sites

Preferably there are several deposit sites for storing the commodity. The deposit sites are preferably located in countries having secure and stable political systems where there is minimal risk of misappropriation of the asset by the government or private persons. The deposit sites will typically be a bank; however, other secure vault facilities could also serve as the deposit site. Typical site locations would be London, New York, Zurich and Tokyo, as well as other locations.

The deposit site provides facilities for safe and secure storage of the commodity to be used for currency. Typically such deposit site consists of a protected vault. The bank or protected vault that is servicing the GCH system users will have the ability to (1) receive the commodity from a client, (2) return the commodity to a client, (3) test the purity of the commodity, (4) measure the weight and/or other physical properties of the commodity, (5) provide identifying information for each parcel of the commodity placed within the deposit site in order to distinguish between the different parcels belonging to the different clients of the deposit site, (6) report to the client the quantity of the commodity stored by the client at the deposit site, and (7) provide identifying information and the capability to physically separate from the total quantity of the commodity stored in the deposit site those parcels of the commodity to be designated for use as currency.

The Commodity

The commodity must be non-perishable, and most preferably has a high ratio of value to weight and volume. In a preferred embodiment, the commodity comprises a precious metal, such as silver, or most preferably, gold of a specified purity. However, several other commodities, notably crude oil and other petroleum products may also serve as the commodity used to designate units of account in the system.

Gold has three unique advantages as money. Each of these are inherent to gold, and they are not advantages available to any national currency.

When defined to a precise weight, gold is a consistent and unvarying unit of account. An ounce of gold is knowable and unvarying. An ounce today is the same as an ounce yesterday or an ounce twenty years ago. However, a national currency does not have these characteristics. A U.S. Dollar or a Deutschemark or a Swiss Franc on deposit in Bank AAA is not the same as the same currency on deposit at Bank CCC because these two banks have different levels of capital and a different mix of assets. Therefore, Dollars or other currencies on deposit in these unrelated institutions have entirely different levels of risk, so the national currency is not a consistent and unvarying unit of account.

Gold is non-national money, which means that it is outside the scope of government. Therefore, gold is not subject to the political process because it is beyond the control of governments, their central banks and monetary authorities. The result is that gold over long periods of time tends to hold its purchasing power better than any national currency. And as set forth above, gold extinguishes an obligation on delivery.

Opening of an Account

The system and process of the invention require system users to establish account relationships with GCH. The account relationship is confirmed when a system user deposits gold with GCH in one or more of GCH's approved depositories. A system user makes a gold deposit or purchases another person's gold deposit and does so at a specific site. The deposit site then notifies the GCH by data transmission of the identity of a person and units of gold held for the account of that person that gold is available for settling transactions for the benefit of that user.

In particular, additions of currency to the system will be made in the following way: (1) the system user transfers a quantity of the commodity to be used as currency to a deposit site; or (2) the system user notifies the deposit site to earmark all or part of the quantity of the commodity stored at the deposit site by the user. In the first case, the deposit site verifies the receipt of the commodity and provides confirmation to the system user and GCH specifying the quantity and/or other physical attributes of the commodity. In the second case, the deposit site separates the earmarked parcels of the commodity to be used as currency in a separate area of the deposit site designated solely for use of storing earmarked parcels of the commodity comprising the currency of the GCH. Once the physical transfer is completed, the deposit site notifies the GCH that the commodity has been established as currency by the system user.

The GCH then credits the account previously established by the system user at the GCH with the quantity of the commodity specified by the system user which has been established as currency and has been credited to the account of the system user. Once established in this way, the commodity earmarked at the deposit site becomes eligible for use as currency, and the system user may transfer all or part of the commodity units of account to another account within the system.

The balance sheet of GCH reflects (1) the cumulative deposits of its system users, which are liabilities of GCH, and (2) the identical amount of gold as its assets. GCH's financial position is presented in Table No. 1.

TABLE No. 1

| GCH Balance Sheet Before Transaction | | | |
|---|---|---|---|
| ASSETS | | LIABILITIES | |
| Gold Stored in London | 100 oz. | Client A | 100 oz. London |
| Gold Stored in Zurich | 100 oz. | Client A | 100 oz. Zurich |
| Gold Stored in New York | 175 oz. | Client B | 175 oz. New York |
| | 375 oz. | | 375 oz. |

The Computer System

Once a system user establishes an account relationship with GCH, the user has access to an interactive communications network giving access to a computer system. When two system users enter into a trade transaction between themselves, they effect payment through this network.

The GCH computer system is adapted for storing of data and entering the accounts and the transactions affecting the accounts of the participants in the system. Each GCH system user is provided with the means to conduct transactions in the user's account maintained with the GCH. Each account typically includes the name, address and other identifying information of the account holder, a unique account number assigned to each account, an inventory of transactions conducted through each account, and the means to verify the accuracy and authenticity of each transaction conducted for an account when instructed by the account holder.

The computer system thus includes an account data storage device, a transaction data storage means, and a transaction posting means.

The account data storage device is capable of recording data identifying the system user and a number of units of the commodity credited to the user and held in the deposit site for the account of the user.

The transaction data storage means receives and stores records of transactions which are denominated in units of the commodity. These records of transactions include an identification of a system user who will receive a debit, a system user who will receive a credit, the amount of such debit, the amount of such credit, and the identity of the deposit site.

The transaction posting means extracts data from the records of transactions and posts debits and credits to the account data storage device to instantly update the data identifying the number of units of the commodity held for the account of each person involved in the transaction.

The system includes a remote terminal 24 at the deposit site 22 for receiving and sending data to the computer system upon opening or closing of an account and/or when there is a transfer of units of gold. The data is transmitted from the deposit site to the transaction data storage device and includes an identification of units of the commodity 20 held at the site for the account of such person.

The system preferably permits remote access from client terminals 26 to submit transaction records to the system 10, and provides verification means for verifying the bona fides of the person seeking to submit transaction records. This permits the user access to the computer system through an interactive communications network from a location remote from either the GCH or the deposit site.

Typically, the account holder will use a computer which instructs a modem which provides access to the computer system by dialing telephone numbers available to the GCH system users. Once the centralized computer of the GCH 10 is accessed in this way and once entry is made by providing a series of security codes to prevent unwarranted and unwanted access, the GCH client has access to the chosen account to which it is the account holder. Once access has been granted, the account holder may review the account, conduct transactions for the account, review past transactions or other data stored by the centralized computer for the account.

Access to the centralized computer of the GCH permits real time, instantaneous transfers of units of account. To transfer units of account of the commodity in order to complete a financial obligation, the system user (hereafter the "paying client") instructs the GCH (1) to debit from the paying client's account a specified quantity of the commodity, (2) the day and time the specified quantity of the commodity is to be transferred, (3) the account number and other verifying information to specify the identity of the client (hereafter the "receiving client") to whom the payment will be made, and (4) a prearranged series of security codes maintained between the paying client and the GCH in order to provide security and protection from unauthorized transactions.

The centralized computer of the GCH collects the transfer instructions provided by the paying client and enters those instructions into a transaction file maintained to record the authorized transactions for all paying clients. When the appointed day and time is reached, the centralized computer of the GCH completes the transaction by debiting the account of the paying client for the quantity of the commodity instructed by the paying client, and simultaneously credits the account of the receiving client instructed by the paying client. The credit made to the account of the receiving client is made simultaneously as a debit of the account of the paying client. Once the credit of the commodity units of account is made to the designated account of the receiving client, the receiving client has immediate access to those commodity units of account, thereby extinguishing the obligation of the paying client to the receiving client.

For example, A and B enter into a transaction in which A agrees to purchase from B a specific good/service. The price is agreed between them to be 25 ounces of Zurich gold. GCH is then instructed by A to debit A's account for 25.0000 Zurich ounces and pay this amount to B's account. Accounting of gold in ounces should be to at least four decimal points, though five or more decimal points could be used if greater precision in the measurement of value in the exchange is required.

GCH confirms immediate payment to both A and B. The gold is not moved from the storage facility. It remains in the same Zurich location, but it is now stored there by GCH for the account of B instead of A. This changed position is presented in Table No. 2.

The total assets and liabilities of GCH remain unchanged. Only the composition of the liabilities changes, and it only changes after GCH performs its payments function.

The net result of this transaction is that gold is circulating as currency. Gold is used as a monetary unit of account in a transaction of trade and commerce entered into between A and B, and it therefore is circulating as currency even though it remains in safe and secure storage.

TABLE No. 2

| GCH Balance Sheet After Transaction | | | |
|---|---|---|---|
| ASSETS | | LIABILITIES | |
| Gold Stored in London | 100 oz. | Client A | 100 oz. London |
| Gold Stored in Zurich | 100 oz. | Client A | 75 oz. Zurich |
| | | Client B | 25 oz. Zurich |
| Gold Stored in New York | 175 oz. | Client B | 175 oz. New York |
| | 375 oz. | | 375 oz. |

GCH uses a tangible asset (i.e., a defined weight of gold) as the basic monetary unit of account. GCH is a clearing house with assets that are identical to its liabilities. In other words, GCH does not monetize debts and thereby turn the debt obligations of borrowers into currency. GCH will have on hand as an asset the total weight of gold it owes to its depository clients. The Monetary Balance Sheet of GCH is substantially different than that of the Dollar, any national currency, or any existent bank as shown in Table 3.

TABLE No. 3

| Monetary Balance Sheet of Global Clearing House (Denominated in Units of Account Called Ounces) | | | |
|---|---|---|---|
| "Quality of Money" ASSETS | | "Quantity of Money" LIABILITIES | |
| Gold in Secure Storage | 375 oz. | Client Deposits | 375 oz. |
| | 375 oz. | | 375 oz. |

In contrast to any national currency, the "quality of money" is identical to the "quantity of money" on the balance sheet of GCH. This common identity of assets and liabilities illustrates a unique advantage available to users of the invention. Identical assets and liabilities provides certainty that payments will be made as directed and without risk.

Closing of an Account

A system user can subsequently "cash out" of the GCH system by either (1) selling his gold interest to another; (2) withdrawing the user's gold deposited at a deposit site. At this point, the deposit site will notify the GCH that the system user's gold units of account are no longer available to the system, for example, by entering information in the remote terminal at the deposit site.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. An electronic commodity based system for conducting financial transactions, comprising:

at least one deposit site having secure facilities for storage of a commodity;

an inventory of a valuable commodity stored in said secure facilities at a said deposit site, said inventory including a quantity of units of said valuable commodity held at said deposit site for an account of at least one identified person;

a computer system for processing data for accounting transactions denominated in said units of said commodity, having (a) an account data storage device for recording data comprising an identification of persons and a quantity of units of said commodity credited to said account of each of said persons and an identification of said deposit site where said units of commodity are held, (b) a transaction data storage device for receiving records of transactions denominated in units of said commodity from a said person identified as having a quantity of said units of said commodity credited to said account of said person, said records of transactions including at least an identification of a person who will receive a debit, a person who will receive a credit, an amount of a debit of a quantity of said units of said commodity held at a deposit site, an amount of a credit of a quantity of said units of said commodity held at a deposit site, and an identification of the deposit site where said quantity of said units of said commodity are held, (c) a transaction posting device for posting said records of transactions to said account data storage device to update said data comprising an identification of persons and a quantity of units of said commodity credited to said account of said persons at an identified deposit site;

a remote terminal located at said deposit site for receiving and sending data to said computer system, said data identifying a person and a quantity of units of said commodity held at said deposit site for an account of said person;

said electronic commodity based system permitting persons to conduct financial transactions without reliance on national currencies in conducting said financial transactions whereby obligations, of a person receiving a said debit of said units of said commodity held at a deposit site, to another person receiving a said credit of said units of said commodity held at a said deposit site, are extinguished upon posting of said records of transactions, thereby eliminating payment risk.

2. A system in accordance with claim 1 wherein said commodity comprises a precious metal.

3. A system in accordance with claim 2 wherein said precious metal comprises gold.

4. A system in accordance with claim 2 wherein said precious metal comprises silver.

5. A system in accordance with claim 3 wherein said gold is specified to a selected purity.

6. A system in accordance with claim 2 further comprising means for remote access to submit records of transactions to instantly debit and credit a person's accounts.

7. A system in accordance with claim 6 further comprising verification means for verifying the identity of said person obtaining access to said computer system and for confirming that said person is authorized to submit records of transactions to said transaction storage device.

8. A system in accordance with claim 2 wherein said units of said commodity are designated as a payment for a futures contract of a different commodity.

9. An electronic gold based system for conducting financial transactions, comprising:

at least one deposit site having a protected vault;

an inventory of gold stored in said protected vault at a said deposit site, said inventory including a quantity of units of gold held at said deposit site for an account of at least one identified person;

a computer system for processing data for accounting transactions denominated in units of gold, having (a) an inventory data storage device for recording data identifying an amount of gold stored at a said deposit site, (b) an account data storage device for recording data comprising an identification of a person and a quantity of said units of gold stored at said deposit site credited to an account of said person, (c) a verification means for verifying the identity of a person obtaining access to said computer system and for confirming that such person is authorized to submit records of transactions, (d) a transaction data storage means for receiving, from a person obtaining access to said computer system, records of transactions denominated in said units of gold, said records of transactions including at least an identification of a person who will receive a debit, a person who will receive a credit, an amount of said debit in said units of gold, an amount of said credit in said units of gold, and an identification of the deposit site where said units of gold are located, (e) a transaction posting means for posting said records of transactions to said account data storage device to update said data comprising an identification of a person and of a number of units of said gold held at a said deposit site for the account of the person;

a remote terminal located at said deposit site for receiving and sending data to said computer system, said data identifying a person and a quantity of units of gold held at said deposit site for an account of said person;

said electronic commodity based system permitting persons to conduct financial transactions without reliance on national currencies in conducting said financial transactions whereby obligations, of a person receiving a said debit of said units of said commodity held at a deposit site, to another person receiving a said credit of said units of said commodity held at a said deposit site, are extinguished upon posting of said records of transactions, thereby eliminating payment risk.

10. A system in accordance with claim 9 further comprising means for remote access to said computer system to submit and store records of transactions.

11. A system in accordance with claim 10 wherein said gold is of a selected purity.

12. A system in accordance with claim 9 wherein said gold units of account are designated as a required payment in a futures contract for a commodity other than gold.

13. A method of accounting, using a valuable commodity as a deposit currency, implemented by a computer system, comprising the steps of:

creating a deposit account data file for each of a plurality of persons, each said deposit account data file identifying a person, and a number of units of commodity stored at a deposit site for the benefit of the person;

entering records of transactions denominated in units of said commodity, said records of transactions including at least an identification of a person who will receive a debit, a person who will receive a credit, the amount of such debit in units of said commodity, the amount of such credit in units of said commodity, and the identity of the deposit site, posting said records of transactions to debit and credit the deposit account data files of said persons to update said data identifying a number of units of said commodity held for the account of each said person;

said method permitting persons to conduct financial transactions without reliance on national currencies in conducting said financial transactions whereby obligations, of a person receiving a said debit of said units of said commodity held at a deposit site, to another person receiving a said credit of said units of said commodity held at a said deposit site, are extinguished upon posting of said records of transactions, thereby eliminating payment risk.

14. A method in accordance with claim 13 wherein said commodity comprises a precious metal.

15. A method in accordance with claim 14 wherein said precious metal comprises gold.

16. A method in accordance with claim 14 wherein said precious metal comprises silver.

* * * * *

(12) EX PARTE REEXAMINATION CERTIFICATE (7949th)
United States Patent
Turk

(10) Number: US 5,671,364 C1
(45) Certificate Issued: Dec. 28, 2010

(54) METHOD AND SYSTEM FOR THE COMMODITY-BASED CURRENCY FOR PAYMENT OF ACCOUNTS AND ELIMINATION OF PAYMENT RISK

(75) Inventor: James J. Turk, Greenwich, CT (US)

(73) Assignee: Goldmoney Network Limited, St. Helier, Jersey (IM)

Reexamination Request:
No. 90/006,351, Aug. 9, 2002

Reexamination Certificate for:
Patent No.: 5,671,364
Issued: Sep. 23, 1997
Appl. No.: 08/465,430
Filed: Jun. 5, 1995

Related U.S. Application Data

(63) Continuation-in-part of application No. 08/015,588, filed on Feb. 10, 1993, now abandoned.

(51) Int. Cl.
*G06Q 20/00* (2006.01)
*G06F 15/00* (2006.01)

(52) U.S. Cl. .................. 705/39; 340/5.41; 340/5.92
(58) Field of Classification Search .............. 705/39
See application file for complete search history.

(56) References Cited

U.S. PATENT DOCUMENTS

| | | | |
|---|---|---|---|
| 3,573,747 A | 4/1971 | Adams et al. | |
| 4,503,503 A | 3/1985 | Suzuki | |
| 4,529,870 A | 7/1985 | Chaum | |
| 4,538,816 A | 9/1985 | Figueroa | |
| 4,642,767 A * | 2/1987 | Lerner | 705/30 |
| 4,677,552 A | 6/1987 | Sibley, Jr. | |
| 4,694,397 A | 9/1987 | Grant et al. | |
| 4,759,063 A | 7/1988 | Chaum | |
| 4,759,064 A | 7/1988 | Chaum | |
| 4,851,999 A | 7/1989 | Moriyama | |
| 4,914,698 A | 4/1990 | Chaum | |
| 4,926,480 A | 5/1990 | Chaum | |
| 4,947,430 A | 8/1990 | Chaum | |
| 4,949,380 A | 8/1990 | Chaum | |
| 4,977,595 A | 12/1990 | Ohta et al. | |
| 4,980,826 A | 12/1990 | Wagner | |
| 4,988,849 A | 1/1991 | Sasaki et al. | |
| 5,010,485 A | 4/1991 | Bigari | |
| 5,030,806 A | 7/1991 | Collin | |
| 5,117,356 A * | 5/1992 | Marks | 705/30 |
| 5,131,039 A | 7/1992 | Chaum | |
| 5,189,700 A | 2/1993 | Blandford | |
| 5,224,162 A | 6/1993 | Okamoto et al. | |
| 5,258,908 A | 11/1993 | Hartheimer et al. | |
| 5,276,736 A | 1/1994 | Chaum | |
| 5,303,383 A | 4/1994 | Neches et al. | |
| 5,420,405 A * | 5/1995 | Chasek | 235/379 |
| 5,453,601 A | 9/1995 | Rosen | |
| 5,455,407 A | 10/1995 | Rosen | |
| 5,493,614 A | 2/1996 | Chaum | |
| 5,511,121 A | 4/1996 | Yakobi | |
| 5,521,980 A | 5/1996 | Brands | |
| 5,539,825 A | 7/1996 | Akiyama et al. | |

(Continued)

FOREIGN PATENT DOCUMENTS

| | | |
|---|---|---|
| EP | 0 N784 282 A2 * | 11/1992 |
| WO | WO 96/21903 * | 7/1996 |
| WO | WO 02/241120 A2 * | 11/2001 |

OTHER PUBLICATIONS

Fifty Dollar Gold Certificate dated Sep. 1, 1882.*

(Continued)

*Primary Examiner*—Jeanne M Clark

(57) ABSTRACT

A system and method for permitting gold or other commodities to circulate as currency requires a network of system users that participate in financial transactions where payment is made in units of gold. The gold is kept in secure storage at a deposit site for the benefit of the users. The payments in gold are effected through a computer system having data storage and transaction processing programs that credit or debit the units of account of gold held for the account of each system user.

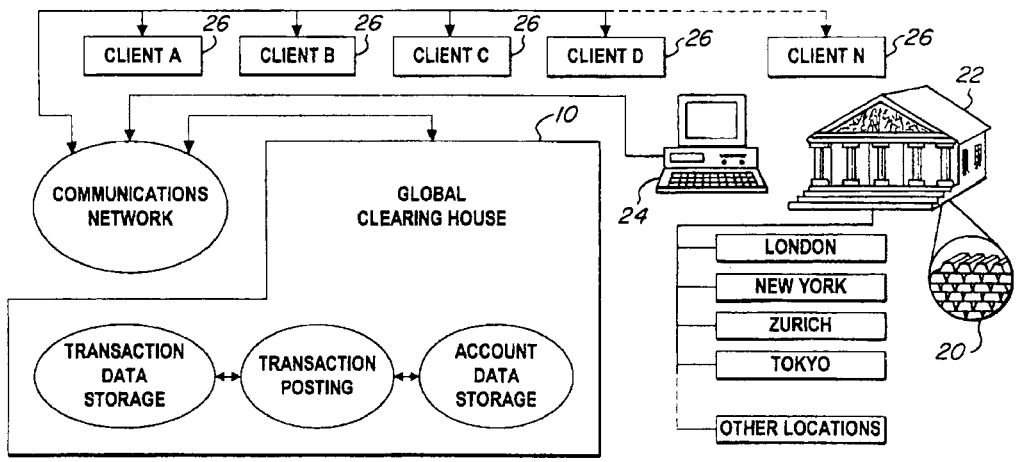

U.S. PATENT DOCUMENTS

| | | | |
|---|---|---|---|
| 5,623,547 | A | 4/1997 | Jones et al. |
| 5,666,493 | A | 9/1997 | Wojcik et al. |
| 5,812,668 | A | 9/1998 | Weber |
| 5,832,089 | A | 11/1998 | Kravitz et al. |
| 5,850,446 | A | 12/1998 | Berger et al. |
| 5,898,154 | A | 4/1999 | Rosen |
| 6,122,625 | A | 9/2000 | Rosen |
| 6,188,993 | B1 | 2/2001 | Eng et al. |
| 6,275,813 | B1 * | 8/2001 | Berka .......................... 705/30 |

OTHER PUBLICATIONS

Five Dollar Silver Certificate dated 1953.*

Haruko, F Guide to Gold: Gold the Ultimate Currency, Euromoney n396 pp. S1–S11, Apr. 2002.*

Website printout, e–Bullion Account Center, printed Dec. 12, 2004, 6 pages.*

Website printout, US Gold Dollar, 1851, 2 apges.*

Liversedge S, Gold Standard Returning in Online Form?, Business News, Jun. 6, 2001, 2 pgs.*

Federal Reserve Bank of Minneapolis, The Region: The World's Goldkeeper (1991), available at http://minneaplisfed.org/pubs/region/9112/reg9112b.cfm) (viisted on Nov. 30, 2006).*

Mary Bellis entitled "ERMA—the Electronic Recording Method of Accounting computer processing system invented at Standard Research Institute," available at http://inventors.about.com/library/inventors/bl_ERMA_Computer.htm (visited on Apr. 18, 2007).*

Printout of 12 CFR, Part 214, from the Electronic Code of Federal Regulations (e–CFR) located at http://ecfr.gpoaccess.gov (visited on Sep. 9, 2007).*

Greenspan, Alan, "Gold and Economic Freedom," 1967, republished at http://www.usagold.com/gildedopinion/greenspan.html (visited on Sep. 12, 2007).*

Rothbard, Murray N., "The Case for a Genuine Gold Dollar," from The Gold Standard: Perspective in the Austrian School. Edited with an Introduction by Llewellyn H. Rockwell, Jr., 1992, pp. 116–130, republished at http://www.mises.org/rothbard/genuine.asp (visited on Sep. 12, 2007).*

Turk, James, "'The Smoking Gun'," Freemarket Gold & Money Report, No. 276, Dec. 11, 2000, republished at http://www.fgmr.com/smokegun.htm (visited on Sep. 17, 2007.*

Neuman, B. Clifford and Gennady Medvinsky, Requirements for Network Payment: The NetCheque Perspective In Proceedings of IEEE COMPCON'95, Mar. 1995.*

Chaum; "Achieving Electronic Privacy",Scientific American; pp. 96–101, Aug. 1992.

Hayek; "Choice in Currency—A way to stop inflation", 1976 The Institute of Economic Affairs, with commentary.

Various authors; NEC ResearchIndex results showing excerpts of articles citing Medvinsky; "NetCash: A design for practical electronic currency on the Internet", Proceedings of the First ACM Conference on Computer and Communications Security, 1993.

Various authors; NEC ResearchIndex results showing excerpts of articles citing Chaum; "Achieving Electronic Privacy", Scientific American; pp. 96–101, Aug. 1992.

Gayle; "Offline digital cash unsuitable to current legal environment", http://www.interesting–people.org/archives/interesting–people/199307/msg00009.html, Jul. 3, 1993.

Newsgroup Posting; From: Howard Gayle, Subject: Why digital gold?, Newsgroup: talk.politics.crypto, Date: Dec. 4, 1993.

Newsgroup Posting; From: Timothy C. May, Subject: Scenario to Ban Cash Transactions?, Newsgroups: sci.crypt, alt.privacy, comp.org.eff.talk, Date: Nov. 25, 1992.

Newsgroup Posting; From: David A. Smith, Subject: Re: Netopia, Newsgroups: alt.cyberpunk, Date: Sep. 2, 1993.

Newsgroup Postings—messages 21–30 from thread; From: various authors, Subject: Re: Netopia, Newsgroups: alt.cyberpunk, Date: Aug. 30, 1993–Sep. 7, 1993.

Hahn; "Truly Anonymous Digital Cash Can Never Work", http://www.lclark.edu/~loren/cyberlaw97/hahn1.html, undated.

Hardy; "The Digital Silk Road", http://www.virtualschool.edu/mon/Bionomics/Extropians/HardyTribbleSilkRoad.html, undated.

Dougherty; "Making Sense Out of Digital Currency", http://www.china.si.umich.edu/econ495/writings/paper/Dougherty.html, undated.

List of Articles (authored by C. Chaum), http://www.chaum.com/articleslist_of_articleshtm, undated.

Winn; "Clash of the Titans: Regulating the Competition Between Established and Emerging Electronic Payment Systems", Berkeley Technology Law Journal, undated.

Planetgold Patent Wars Page—Latest News Nov. 15, 2001, http://planetgold.com/Interview.asp?SPID=32967996, Nov. 15, 2001.

Rahn, et al.; "Research Study 24—Digital Money & Its Impact on Gold: Technical, legal and economic issues", Centre for Public Policy Studies, Nov. 2000.

Davies; "Electronic Money, or E–Money, and Digital Cash", http://www.ex.ac.uk/~Rdavies/arian/emoney.html, Apr. 30, 2002.

MacKie–Mason; "Readings (Preliminary)", http://www–personal.umich.edu/~jmm/courses/si760/readings.html, Nov. 8, 1998.

Turk; "Money and Currency in the $21^{st}$ Century", http://www.goldmoney.com/futuremoney.html, Jul. 1997.

Rahn, et al.; "Digital Money & It's Impact on Gold: Concerns & Issues", http://www.goldbankone.com/article.php?op=Print&sid=105, Jul. 12, 2001.

Konig; "The Evolution of Money—From Commodity Money to E–Money", Unicert IV Program, Jul. 6, 2001.

New World Intelligence report of unknown title, 2002.

Unknown author; "The e–money mandate", Http://www.finextra.com/fullfeature.asp?id=256, May 24, 2002.

Unknown author; "Digital or Just Gold?", http://www.goldecomony.com/article.php?sid=187, May 22, 2002.

North; "Gold Standards: The Good, The Bad, and The Ugly", http://www.lewrockwell.com/north/north108.html, Jun. 21, 2002.

Committee on Payment and Settlement Systems et al., "Security of Electronic Money", Bank for International Settlements, 1996.

May; "Digital Cash and Net Commerce",http://ftp.easynet.nl/mirror/munitions/documents/cyphernomicon/chapter12/12.1.html, Sep. 10, 1994.

Jackson; "Douglas Jackson's personal analysis and opinion regarding patent # 5,671,364: 'Method and system for commodity–based currency for payment of accounts and elimination of payment risk', Inventor: James Turk", undated.

Griffith; "GoldMoney—Title or Claim?", http://www.goldecomony.com/ARTICLE.PHP?SID=169, Feb. 5, 2002.

DigiCash—Company Brochure "DigiCash—Numbers That Are Money" Jun. 11, 1997; 4 pages.

Roberds; "The rise of electronic payments networks and the future role of the Fed with regard to payment finality"; Economic Review; Dialog File 15, Accession No. 00739433, Mar. 1993.

Juncker et al; "A primer on the settlement of payments in the United States"; Federal Reserve bulletin; col. 77, No. 11, Nov. 1991.

Muhammad; "Electronic commerce and the future of money", Black Enterprise v27n11, pp. 255–261; Dialog File 15, Accession No. 01427279, Jun. 1997.

Giles; "Electronic commerce", Network VAR, v5, n5, p. 26(7); Dialog File 15, Accession No. 02069436, May 1997.

Email; From: Ken Griffith; Sent: Tuesday, Jul. 31, 2001 3:00 PM; To: Douglas Jackson; Subject: A Challenge to the Gold-Money Patent.

Email; Subject: [e–gold–list] inventions requiring a response; Date: Mon, Nov. 5, 2001 18:42:23–0500; From: Douglas Jackson; To: "e–gold Discussion".

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

Claims 1-16 are cancelled.

* * * * *